UNITED STATES PATENT OFFICE.

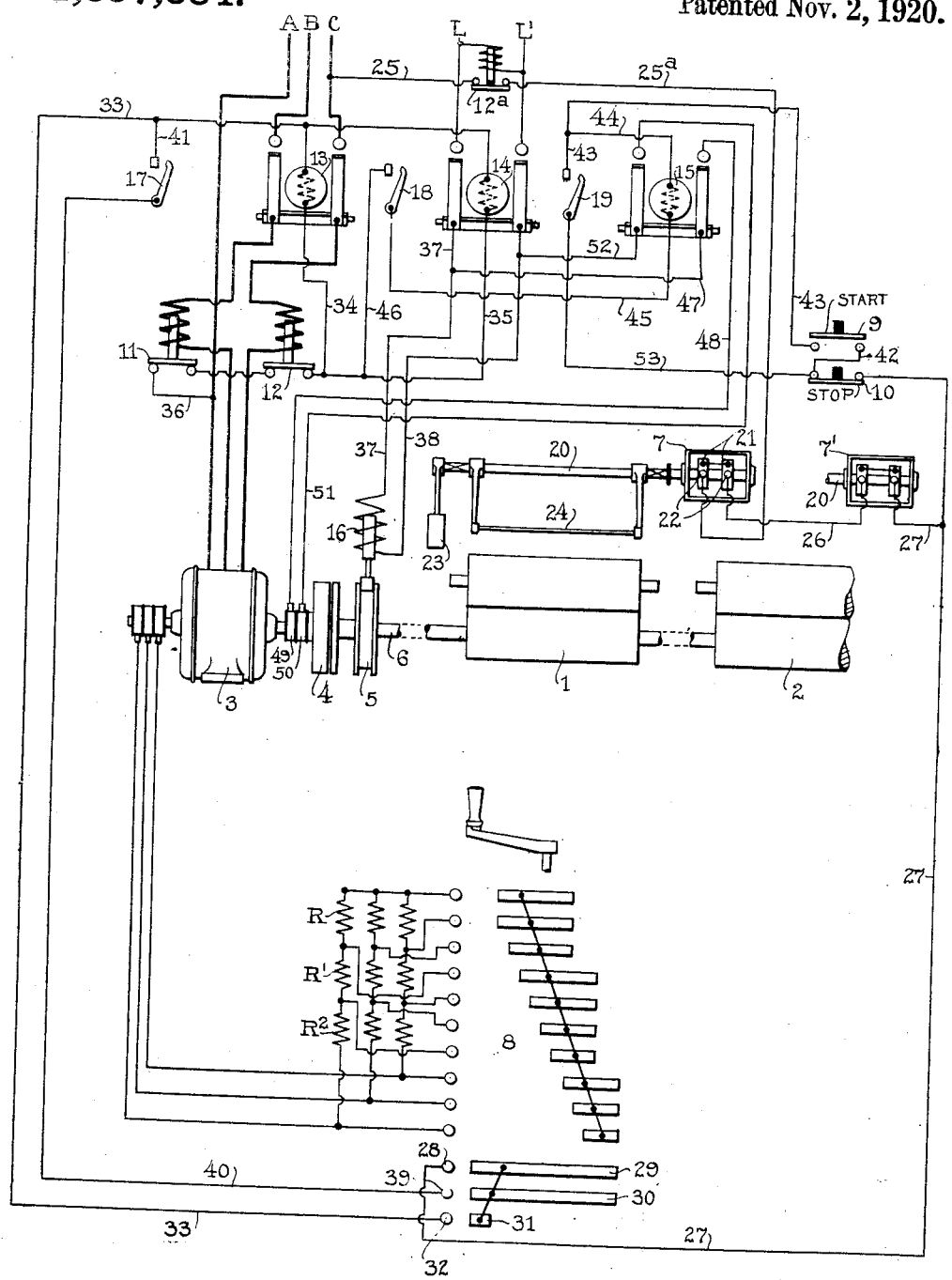
W. E. DATE.
CONTROLLER FOR MOTOR DRIVEN MACHINES.
APPLICATION FILED DEC. 6, 1917.
1,357,384.
Patented Nov. 2, 1920.
INVENTOR.
William E. Date
BY Frank H. Hubbard
ATTORNEY

WILLIAM E. DATE, OF WESTFIELD, NEW JERSEY, ASSIGNOR TO THE CUTLER-HAMMER MFG. CO., OF MILWAUKEE, WISCONSIN, A CORPORATION OF WISCONSIN.

CONTROLLER FOR MOTOR-DRIVEN MACHINES.

1,357,384. Specification of Letters Patent. Patented Nov. 2, 1920.

Application filed December 6, 1917. Serial No. 205,867.

*To all whom it may concern:*

Be it known that I, WILLIAM E. DATE, a citizen of the United States, residing at Westfield, in the county of Union and State of New Jersey, have invented new and useful Improvements in Controllers for Motor-Driven Machines, of which the following is a full, clear, concise, and exact description, reference being had to the accompanying drawing, forming a part of this specification.

This invention relates to improvements in controllers for motor-driven machines and is particularly applicable to motor-driven rubber mills.

In machines of this character it has been customary to include an electromagnetic clutch between the mill and its driving motor and to provide an electrically controlled brake for the mill whereby the latter may be quickly stopped in an emergency, said brake being also applied in stopping under ordinary conditions.

The present invention has among its objects to provide a controller for the aforesaid and other machines operable to both uncouple and brake the machine for emergency stopping, and operable, under service conditions, to provide for stopping of the machine merely by uncoupling the same from the driving motor without application of the brake, thus relieving the parts of unnecessary braking strains and wear.

A further object is to provide for automatic stopping of the motor and uncoupling and braking of the machine upon failure of voltage in any of the supply lines thereof and to insure against automatic restarting thereof upon restoration of voltage.

A further object is to provide means insuring against starting of the motor except when relieved of the load of the machine and when electrically protected.

A further object is to insure release of the braking means during starting of the machine.

Other objects and advantages will hereinafter appear.

The accompanying drawing, wherein is illustrated an embodiment of the invention, is a diagrammatic view showing the relation of the various parts and certain proposed electrical connections.

Referring to the drawing, the driven machine, which may include any desired number of mills, is represented diagrammatically by two sets of rolls 1, 2, one roll of each set being driven through suitable connections by an electric motor 3 through an electromagnetic clutch 4, which clutches only during energization of its winding. An electromagnetically controlled brake 5 is provided on the roll shaft 6 to be withheld by its winding and to apply upon deënergization thereof. Thus the motion of both sets of rolls may be substantially instantaneously arrested through interruption of the circuits of the respective windings of the clutch and brake by means of suitable safety or emergency switches 7, 7', one of which is preferably located adjacent to each set of rolls.

A drum controller 8 is provided for the motor 3, suitable interlocks being also provided whereby said controller is operable to start the motor only during deënergization of the clutch winding and with starting resistance included in the motor secondary circuit, the starting and service stopping of both mills being respectively effected by means of starting switch 9 and stopping switch 10.

The driving motor illustrated is of the alternating current type adapted to be supplied with current from an alternating current source A, B, C, the motor secondary circuit being provided with certain steps of resistance R, R', R² for acceleration and deceleration of the motor by controller 8 in a well known manner. The electromagnetically operated switches for controlling the motor and rolls are also supplied with current by connection across lines A, C, while lines B and C include the windings of suitable overload switches 11, 12 which control the supply of current to said electromagnetically operated switches. By this arrangement, upon the occurrence of an overload or upon failure of voltage in any of said lines, said control switches automatically open to stop the motor. The energizing circuits of the clutch 4 and brake 5 are supplied with direct current from lines L, L'.

A no-voltage relay 12ª, biased to open position but normally retained closed by its winding which is connected across D. C. lines L, L', also controls the supply of current to said electromagnetically controlled switches, whereby upon failure of the D. C. voltage said switches are likewise deënergized.

The electromagnetic control switches comprise three double pole relays 13, 14, 15, of which relay 13 controls lines B and C of the motor primary circuit, line A extending to the motor without interruption, relay 14 controls the energization of brake coil 16, while relay 15 controls the circuit through the winding of clutch 4. The windings of relays 13 and 14 are connected in parallel, thus insuring release of the brake 5 upon starting of the motor. Relays 14 and 15, moreover, are both connected across lines L, L' in such relation as to jointly control the winding of clutch 4 and to provide control of brake coil 16 by relay 14 independently of relay 15, thereby providing for release of the brake independently of the clutch while preventing engagement of the clutch except while the brake is released. An auxiliary switch 17 operates in conjunction with relay 13 to close a maintaining circuit therefor and for relay 14, the latter being also provided with an auxiliary switch 18 which establishes a circuit for relay 15 including the normally open starting switch 9, while said relay 15 is likewise provided with an auxiliary switch 19 controlling a maintaining circuit therefor, which circuit includes the normally closed stopping switch 10, whereby only the clutch is controlled by said stopping switch.

Emergency switches 7, 7' are arranged in series in the maintaining circuit of all the aforesaid relays whereby actuation of either of said switches serves to release the clutch, apply the brake and stop the motor. Said emergency switches are of similar construction, each comprising a horizontal shaft 20 carrying electrically connected contacts 21 to normally bridge a pair of fixed contacts 22. A depending weight 23 secured to the shaft 20 serves to bias the same to circuit making position, while an oscillatable hand rail or cradle 24 is secured to said shaft within easy reach of the mill operator, whereby in an emergency said control circuit may be opened to provide practically instantaneous stopping of the mill and motor.

The various parts being in the relations illustrated, the operation of the controller is as follows: Movement of the controller to its first or starting position completes the energizing circuit of relays 13 and 14, said circuit extending from line C by conductor 25 through normally closed relay 12ª, by conductor 25ª through emergency switch 7, by conductor 26 through emergency switch 7' and by conductor 27 to controller fixed contact 28, thence through controller movable contacts 29, 30 and 31 to fixed contact 32 and by conductor 33 through the windings of relays 13 and 14 in parallel thence by conductors 34 and 35 to and through overload switches 12 and 11 and by conductor 36 to line A. Relays 13 and 14 thereupon respond to close the motor primary lines B and C for starting the motor, and to complete the circuit of brake releasing coil 16 respectively.

The motor primary circuit, as thus completed, comprises the permanent line A, line B which includes the winding of overload switch 11 and the left pole of relay 13, and line C including the winding of overload switch 12 and the right pole of said relay.

The circuit of brake releasing coil 16 extends from line L through the left pole of relay 14 thence by conductor 37 to and through said brake coil 16, returning by conductor 38 through the right pole of relay 14 to line L'. Closure of said circuit releases brake 5.

Closure of relay 13 furthermore actuates auxiliary switch 17 to close a maintaining circuit for relays 13 and 14, said circuit extending from line C to the controller fixed contact 28 as hereinbefore traced, thence through controller movable contacts 29 and 30 to fixed contact 39, thence by conductor 40 through said auxiliary switch 17 and by conductor 41 to conductor 33, thence through the windings of said relays to line A as already traced.

Closure of relay 14 likewise actuates auxiliary switch 18 thereby establishing the energizing circuit of relay 15, said circuit extending from line C to conductor 27 as above traced, thence through normally closed stop switch 10, and by conductor 42 to the normally open starting switch 9, the line thence extending by conductors 43 and 44 through the winding of relay 15, by conductor 45 through said auxiliary switch 18 and by conductor 46 to conductor 35, thence through overload switches 12 and 11 to line A as above traced. Relay 15 may now be actuated to engage the clutch 4 by closure of starting switch 9.

Further actuation of controller 8 serves to accelerate the motor through the exclusion of progressive steps of starting resistance in a well known manner. Furthermore movement of the controller beyond the first position interrupts the closing circuit of relays 13 and 14 by disengagement of the controller short contact 31 from its corresponding fixed contact 32, said relays being thereafter retained closed through their maintaining circuit above described. By this arrangement of the controller contacts, upon stopping of the motor for any cause, the same can be restarted only by returning said controller to its starting position.

The motor being now running at the desired speed and the brake 5 being released, starting switch 9 is closed, thus completing the circuit of relay 15 as above described. Said relay thereupon responds to close the energizing circuit of clutch 4 for coupling the mill to the motor, said circuit extending from line L to conductor 37 as above traced, and by conductor 47 through the right pole of relay 15, thence by conductor 48 to the left clutch slip ring 49 and through the windings of said clutch to the right slip ring 50, thence by conductor 51 to and through the left pole of relay 15 and by conductors 52 and 38 to line L', as heretofore traced.

Closure of relay 15 furthermore actuates auxiliary switch 19 to close a maintaining circuit for said relay, said circuit extending from line C to and through stop switch 10 as above traced, thence by conductor 53 through said auxiliary switch 19, and by conductors 43 and 44 through the winding of said relay, returning to line A as above traced. Starting switch may now be released, relay 15 being retained closed through the above described maintaining circuit.

Service stopping of the mill rolls may be accomplished by depressing stop switch 10 thereby interrupting the maintaining circuit of relay 15, whereupon said relay opens, together with auxiliary switch 19, whereby the clutch 4 is released, thus disconnecting the rolls from the driving motor. Auxiliary switch 19 being now opened the mill is not restarted upon release of stop switch 10 but may be again started only by closing of starting switch 9 as above described. It is to be noted that during the above described service stopping of the mill the brake 5 is not applied.

Service stopping of the motor may now be accomplished by moving the controller to off position, thereby interrupting the maintaining circuit of relays 13 and 14 between the controller fixed and movable contacts, whereupon said relays open to deenergize both the motor primary circuit and the brake releasing coil. Opening of relays 13 and 14 serves further to open respectively the auxiliary switches 17 and 18, the former action insuring starting of the motor only by the return of the controller to its first or starting position. Opening of the latter auxiliary switch serves to release the clutch 4 by interruption of the maintaining circuit of relay 15, as above described, thus insuring disconnection of the rolls from the motor prior to starting the latter. Opening of relay 15 also serves to open auxiliary switch 19 whereby said relay may be subsequently closed for causing engagement of the clutch only through actuation of the starting push button. Obviously the occurrence of an overload or voltage failure in any of the motor primary lines or failure of the D. C. voltage will produce an effect similar to that of opening the controller circuit as above described.

Actuation of either of the emergency switches interrupts the maintaining circuit for all the relays thereby disconnecting the rolls from the motor, applying the brake to the rolls and deënergizing the motor, all in the manner above described. Furthermore, following such emergency stopping of the rolls and the motor, the same may be restarted only in the normal manner above described and following re-setting of the emergency switch, which latter is accomplished automatically by the suspended biasing weight 23 upon release of the hand rail 24.

What I claim as new and desire to secure by Letters Patent is:

1. The combination with a driving motor, a machine to be driven thereby, a releasable coupling therebetween and a brake for said machine, of associated coupling and brake controlling means operable to provide for stopping of said machine through release of said coupling means with and without the aid of said braking means.

2. The combination with a driving motor, a machine to be driven thereby and a releasable coupling therebetween, of associated motor and coupling controlling means operable to start said motor and to actuate said coupling means, said controlling means including means to prevent starting of said motor except when electrically protected and while said coupling is disengaged.

3. The combination with a driving motor, a machine to be driven thereby, a releasable coupling therebetween and a releasable brake for said machine, of associated motor, coupling and brake controlling means operable to start said motor, to release said brake and to actuate said coupling, said controlling means including means to prevent actuation of said coupling except subsequent to starting of said motor and releasing of said brake.

4. The combination with a driving motor, a machine to be driven thereby, a releasable coupling therebetween and a brake for said machine, of associated motor, coupling and brake controlling means operable to provide for stopping of said machine by release of said coupling either with or without setting of said brake and operable automatically upon voltage failure or overload of said motor to disconnect the same, to release said clutch, and to provide for application of said brake.

5. The combination with a driving motor, a machine to be driven thereby, a releasable coupling therebetween and a releasable brake for said machine, of associated motor, coupling and brake controlling means operable to release said coupling, apply said brake and stop said motor, said controlling means being further operable to release said coupling without applying said brake or stopping said motor.

6. The combination with a driving motor, a machine to be driven thereby, a releasable coupling therebetween and a releasable brake for said machine, of associated electro-responsive control means for said coupling and brake, said control means being operable selectively to provide for stopping of said machine by releasing said coupling either with or without applying said brake.

7. The combination with a driving motor, a machine to be driven thereby, a releasable coupling therebetween and a releasable brake for said machine, of associated electro-responsive control means for said coupling and brake, a service switch and an emergency switch, said control means being operable through said service switch to provide for stopping of said machine by releasing said clutch without application of said brake and operable through said emergency switch to stop said machine by releasing said clutch and applying said brake.

8. The combination with a driving motor, a machine to be driven thereby, a releasable coupling therebetween and a releasable brake for said machine, of associated electro-responsive control means for said motor, coupling, and brake, a service stopping switch and an emergency stopping switch, said control means being operable through said service switch to provide for stopping of said machine by releasing said coupling without application of said brake and operable through said emergency switch to stop said machine by both releasing said coupling and applying said brake, and to stop said motor.

9. The combination with a driving motor, a machine to be driven thereby and a releasable coupling therebetween, of associated electro-responsive switches controlling said motor and said coupling, protective resistance for said motor, and interlocks for said switches operable to prevent starting of said motor except when protected by said resistance and while said coupling is disengaged.

10. The combination with a driving motor, a machine to be driven thereby and a releasable coupling therebetween, of associated electro-responsive switches controlling said motor and said coupling, protective resistance for said motor, a controller operable to start said motor and to accelerate the same through progressive exclusion of said resistance, and interlocks for said controller and said switches, said interlocks serving to prevent starting of said motor by said controller except while said resistance is included in circuit and while said coupling is released.

11. The combination with a driving motor, a machine to be driven thereby and a releasable coupling therebetween, of associated electro-responsive switches to be energized from the motor current source subject to control by suitable overload means, said switches controlling said motor and said coupling, protective starting resistance for said motor, a controller operable to start and stop said motor and interlocks for said controller and said switches, said interlocks serving, upon stopping of said motor either by said controller or through voltage failure or overload, to prevent restarting of said motor except by means of said controller and while said resistance is included in circuit and said coupling disengaged.

12. The combination with a driving motor, a machine to be driven thereby, a releasable coupling therebetween and a releasable brake for said machine, of associated electro-responsive switches to be energized from the motor current source subject to control by suitable overload means, said switches controlling said coupling and said brake, and control means for said switches selectively operable to actuate the same jointly to release said coupling and provide for application of said brake, and to actuate one switch independently for releasing said coupling without application of said brake.

13. The combination with a driving motor, a machine to be driven thereby, a releasable coupling therebetween and a releasable brake for said machine, of associated electro-responsive switches to be energized from the motor current source subject to control by suitable overload means, said switches controlling said coupling and said brake, and control means for said switches selectively operable to actuate the same jointly to release said coupling and provide for application of said brake, and to actuate one switch independently for releasing said coupling without application of said brake, said switches being interlocked to prevent actuation of said coupling except while said brake is released.

14. The combination with a driving motor, a machine to be driven thereby, a releasable coupling therebetween and a releasable brake for said machine, of an electro-responsive switch controlling said coupling and brake jointly, an electro-responsive switch controlling said coupling independently of said brake, a control switch for said first mentioned electro-responsive switch, a control switch for said second mentioned electro-responsive switch, said electro-responsive switches being interlocked to prevent actuation of said coupling except upon a given positioning of said first mentioned control switch and while said brake is released.

15. The combination with a driving motor, a machine to be driven thereby and a releasable electromagnetic coupling therebetween adapted to be energized from a source of current distinct from the source of motor current, of associated electro-responsive switches controlling said motor and said coupling and control means for said switches effective to provide for stopping of said motor and release of said clutch upon voltage failure of either of said sources.

16. The combination with a driving motor, a machine to be driven thereby and an electromagnetically releasable brake for said machine adapted to be energized from a source of current distinct from the source of motor current, of associated electro-responsive switches to be energized from the motor current source said switches controlling said motor and brake, and control means for said switches effective upon voltage failure of either of said sources to provide for stopping of said motor and application of said brake.

17. The combination with a driving motor, a machine to be driven thereby, a releasable electromagnetic coupling therebetween and an electromagnetically releasable brake for said machine, certain of said instrumentalities being adapted to be energized from a source of current distinct from that of said motor, of associated electro-responsive switches to be energized from the motor current source, said switches controlling said motor, coupling and brake, and control means for said switches effective to provide for stopping of said motor, release of said clutch and application of said brake upon voltage failure of either of said sources.

18. The combination with a driving motor, a machine to be driven thereby, a releasable electromagnetic coupling therebetween and an electromagnetically releasable brake for said machine, certain of said instrumentalities being arranged for energization from a source of current distinct from the source of motor current, of associated electro-responsive switches to be energized from the motor current source subject to control by suitable overload means, said switches controlling said motor, coupling and brake, protective starting resistance for said motor, a controller operable to start and stop said motor and interlocks for said controller and said switches, said interlocks serving upon stopping of said motor either by said controller or through overload or by reason of voltage failure of either of said sources to prevent restarting of said motor except by means of said controller and while said resistance is included in circuit, said coupling disengaged and said brake released.

19. The combination with a driving motor, a machine to be driven thereby, a releasable electromagnetic coupling therebetween, of electro-responsive control means operable to insure disengagement of said coupling during starting of said motor and providing for engagement and disengagement thereof at will after starting of said motor, said means further providing for automatic disengagement of said clutch upon voltage failure or overload in the circuit of said motor.

20. The combination with a driving motor, a machine to be driven thereby, a releasable electromagnetic coupling having an energizing circuit separate from the motor circuit, control means operable to insure disengagement of said coupling during starting of said motor, and providing for engagement and disengagement thereof at will after starting of said motor, said means further providing for automatic disengagement of said coupling upon an overload in the circuit of said motor or upon failure of voltage in either of said circuits.

21. The combination with a machine to be driven, electro-responsive means for establishing a driving connection therefor, an electro-responsive brake for said machine, of electro-responsive control means for said brake and said former means operable to insure disengagement of said brake upon establishment of the driving connection by said means and providing for stopping of said machine with or without setting of said brake upon interruption of the driving connection by said means.

In witness whereof I have hereunto subscribed my name.

WILLIAM E. DATE.